United States Patent [19]

Luchaco

[11] 4,449,074
[45] May 15, 1984

[54] EXCESS LIGHT TURN-OFF CIRCUIT

[75] Inventor: David G. Luchaco, Macungie, Pa.

[73] Assignee: Lutron Electronics Co., Inc., Coopersburg, Pa.

[21] Appl. No.: 468,870

[22] Filed: Feb. 23, 1983

[51] Int. Cl.³ ............................................. H05B 37/02
[52] U.S. Cl. ................................... 315/159; 250/205;
250/214 AL; 315/158; 315/360
[58] Field of Search ............... 315/151, 158, 159, 307,
315/360; 250/205, 214 AL

[56] References Cited

U.S. PATENT DOCUMENTS

| | | | | |
|---|---|---|---|---|
| 4,135,116 | 1/1979 | Smith | ............................ | 315/307 X |
| 4,236,101 | 11/1980 | Luchaco | ............................ | 315/158 |
| 4,346,331 | 8/1982 | Hoge | ............................ | 250/214 AL |

*Primary Examiner*—Eugene R. LaRoche
*Attorney, Agent, or Firm*—Ostrolenk, Faber, Gerb & Soffen

[57] ABSTRACT

An illumination control device controls the level of artificial lighting depending upon the intensity of natural light in the area being controlled. A single adjustment is used to set the switching point at which the illumination control device becomes operative. An indicator is provided to indicate the adjustment status before a change in the artificial light condition occurs. A filter is employed to produce turn-on and turn-off time delays which differ from one another and are automatically changed in accordance with the instantaneous light level which exists prior to a necessary circuit switching operation.

16 Claims, 5 Drawing Figures

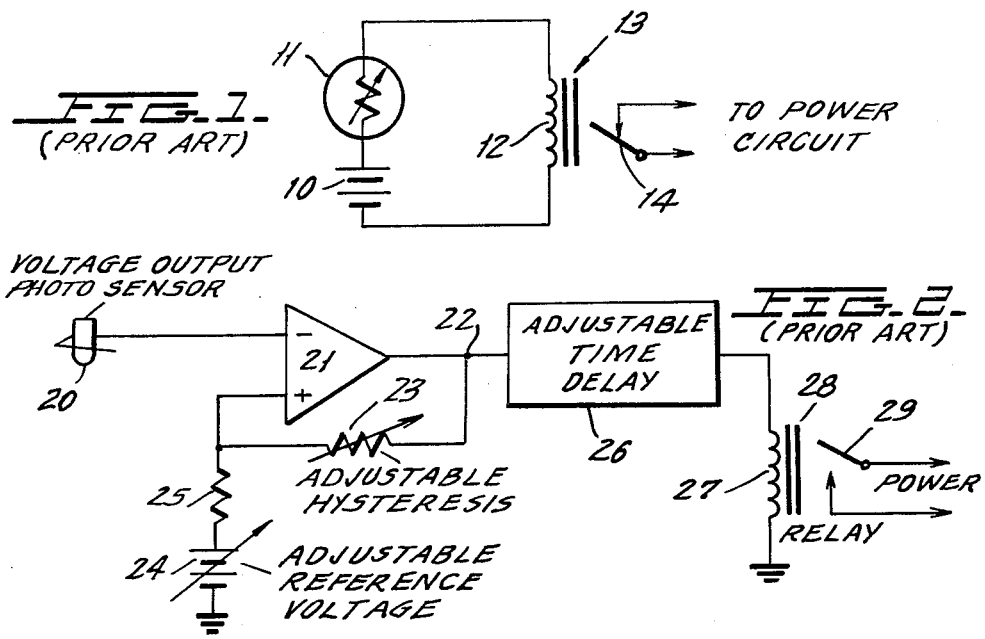
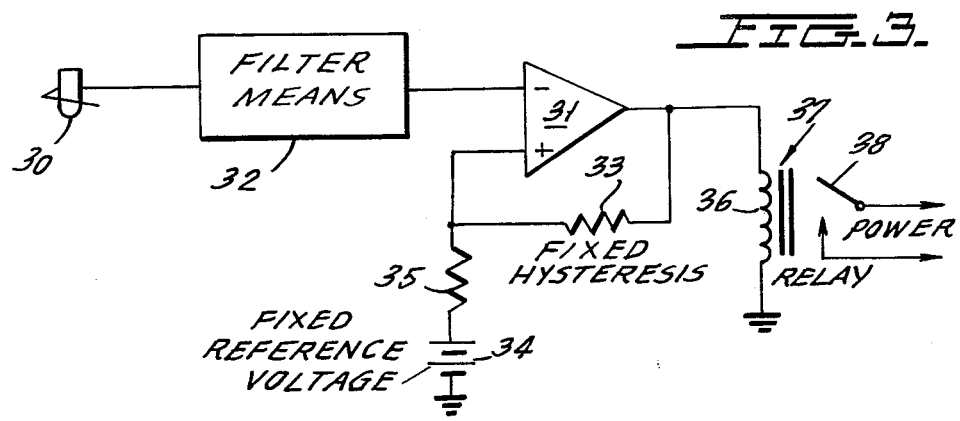
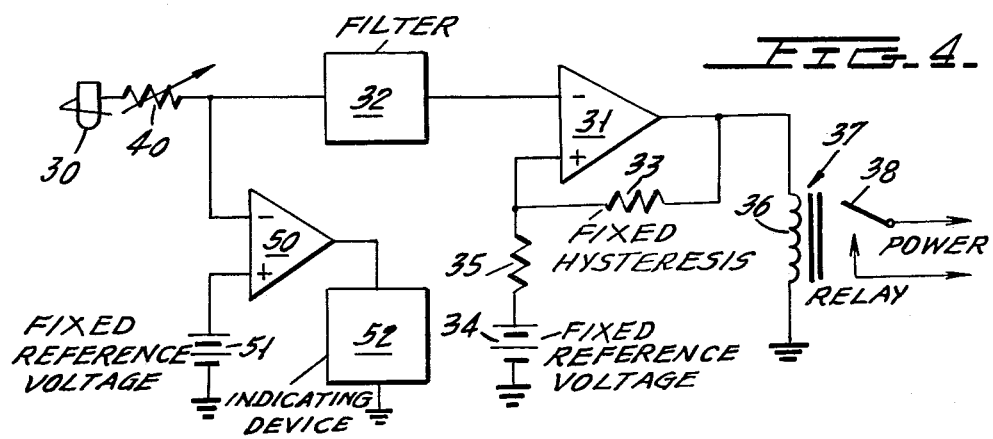

EXCESS LIGHT TURN-OFF CIRCUIT

BACKGROUND OF THE INVENTION

This invention relates to electrical energy reduction means for controlling artificial light intensity in accordance with the level of available natural light, and more particularly relates to an energy saving circuit and system of this type which requires only a single user adjustment and which reduces unnecessary cycling to a minimum.

It is well known that in areas which are illuminated by both natural light and artificial light that the artificial light can be reduced when the level of natural light in the area is sufficient to serve predetermined purposes.

A simple photosensor which switches an electromechanical relay in accordance with the level of natural illumination is commonly used to control exterior lighting, such as lighting in parking lots or building floodlights. While the simple arrangement of a photosensor and an electromechanical relay performs satisfactorily for control of an exterior light, such a simple arrangement cannot be used for control of indoor lighting. This is because the control of light level in indoor lighting situations is much more critical than for an outdoor arrangement, so that the device may continually switch indoor lamps on and off to adjust for relatively small changes in outdoor lighting due to clouds obscuring the sun, and the like. This would not cause the switching of the device in an outdoor installation where the adjustment is relatively non-critical and artificial lights are not turned on until substantial dark conditions are achieved.

U.S. Pat. No. 4,281,365, in the names of Elving and Carlson, discloses a control arrangement which can be used indoors. A comparator circuit is employed which receives inputs from a photoelectric sensing means and from an input reference circuit. A hysteresis circuit is also disclosed so that the light level at which the comparator output level goes from a high state to a low state is significantly different from the light level at which the output goes from a low state to a high state. The comparator output then actuates a timing means which delays the operation of a power control device which controls the indoor lamps and delays their change in state for some fixed period after the change in comparator output state occurs. This time delay is intended to prevent frequent on/off switching cycles due to broken cloud cover which causes frequent changes in the natural light level.

In a system of this type, however, no matter what time delay period is chosen for the operation of the system, rapid variation of natural daylight conditions can still cause sufficiently frequent cycling to result in extremely uncomfortable work conditions for those within the controlled area. Furthermore, several separate adjustments must be made in setting the system operation. Thus, there must be separately adjusted the switch-on level, the switch-off level (or amount of hysteresis), the time delay for turning lights on after light has increased above a given threshold value and the time delay for beginning to reduce light level after a lower threshold has been reached. These adjustments are generally made by potentiometers or the like and each single adjustment may affect all of the others. Consequently, adjustment becomes a difficult and tedious task and takes a great deal of time since one must observe the system operation over widely varying ranges of natural light and conditions and the person making the adjustment must have a high level of understanding of the system operation. As a result of these difficulties, it has been found that in actual installations the system is never satisfactorily adjusted, so that the potential advantages of the system are unavailable to the average user and the potential energy savings are lost.

BRIEF DESCRIPTION OF THE INVENTION

In accordance with one aspect of the present invention, the output of a light sensor is passed through an adaptive electrical filter network before it is applied to the input of a comparator circuit. The filter serves the purpose of producing the two necessary time delays for increasing and reducing artificial light levels, respectively. The time delays produced are automatically variable and depend upon the character of the natural light being sensed at any given time. The novel filter of the invention causes the system to adapt its operating parameters to instantaneous conditions. Due to this adaptive control capability, it is possible to fix many of the system parameters to known values and to provide only a single adjustment which the user may make after installation of the unit.

In accordance with another feature of the invention, a novel indicator circuit is provided to indicate to the user when a proper adjustment level has been reached of the single adjustment control, such as a potentiometer.

The system of the novel invention minimizes the number of on/off switching cycles and substantial energy will be saved while still minimizing disturbance of the users in the controlled area.

Preferably, when employing the invention, the photosensing device will be mounted in a region within the controlled area and has an optimally chosen spatial response such that the sensor response to natural light is maximized and its response to artificial light is minimized despite the fact that the sensor is mounted within the controlled area. An arrangement of this type is shown in my prior U.S. Pat. No. 4,236,101. By mounting the photosensor within the controlled area, the natural light level sensed will be subject to the same window modification effects (for example due to glass area, transmittance and glare control) and more accurate control is possible, thereby maximizing energy savings while still maintaining adequate illumination in the controlled area.

BRIEF DESCRIPTION OF THE DRAWINGS

FIG. 1 schematically illustrates a prior art control employing a single photosensor and a single electromechanical relay.

FIG. 2 shows a second prior art control arrangement in which a comparator circuit and time delay circuit are employed along with an adjustable hysteresis circuit and an adjustable reference circuit.

FIG. 3 schematically illustrates a first embodiment of the present invention, wherein a novel filter is employed between the photosensor output and the comparator input.

FIG. 4 schematically illustrates a second embodiment of the invention which employs a novel indicator device which indicates when a single adjustment member has obtained the desired adjustment value after installation of the system.

DETAILED DESCRIPTION OF THE DRAWINGS

Figure 5:
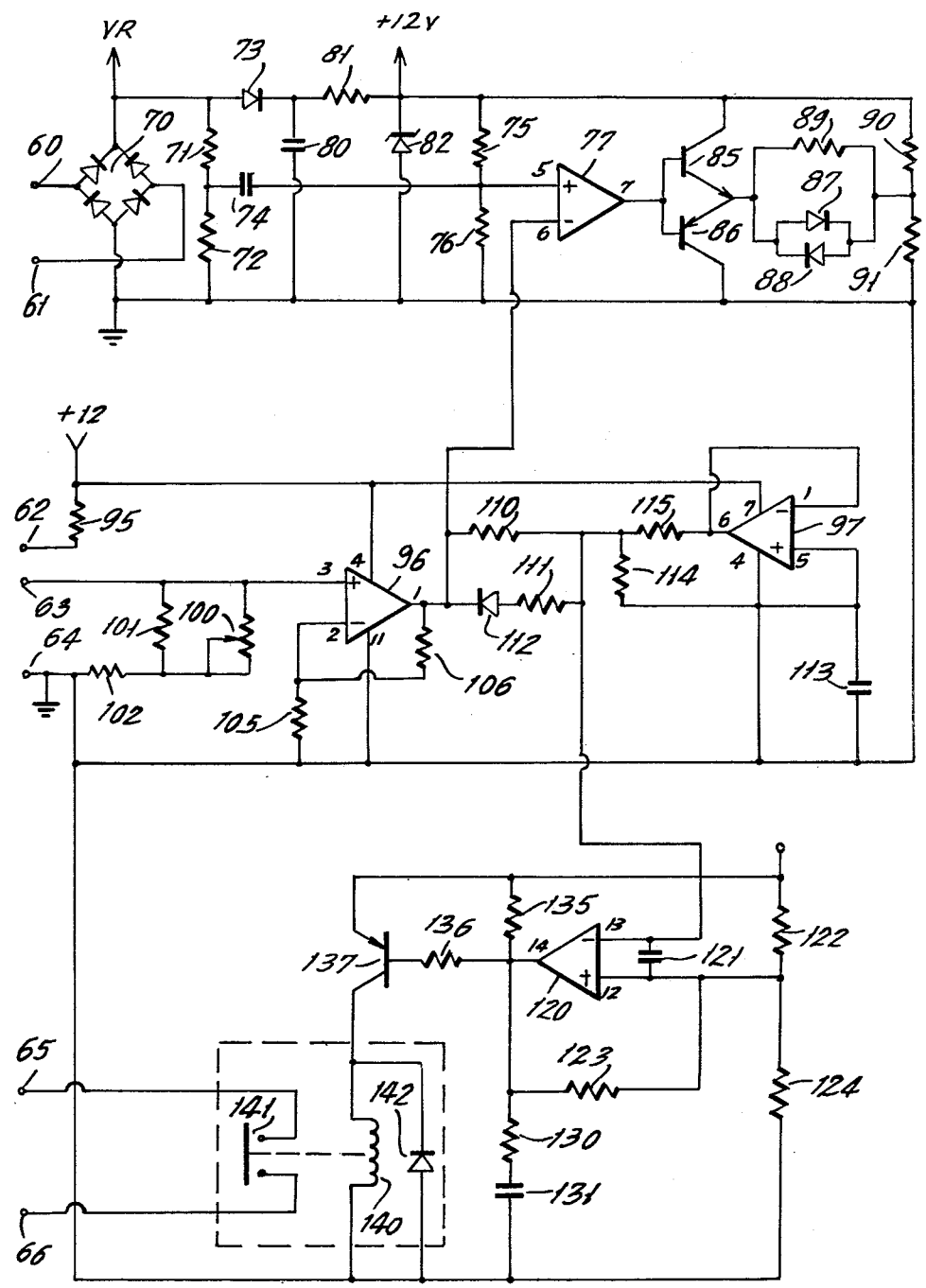
FIG. 5 is a detailed circuit diagram of the embodiment of FIG. 4.

Referring first to FIG. 1, there is shown a simple well known circuit which is commonly employed for controlling the lighting of an outdoor area, such as a parking lot or building floodlights. A suitable power supply, schematically illustrated as the battery 10, is connected in series with a suitable photoresistive sensor 11 and the relay coil 12 of a conventional electromechanical relay 13. Relay 13 could, for example, have normally closed contacts 14. The normally closed contacts 14 are then connected in series with an electrical power circuit which energizes the exterior lights such as floodlights, or the like. The photoresistive sensor 11 has a resistance dependent upon the level of incident illumination. As the illumination level falling on the cell 11 increases, its resistance decreases until sufficient current flows in the relay coil 12 to cause the relay contacts 14 to change state. Thus, if the relay 13 has normally closed contacts, as shown in FIG. 1, once the artificial light achieves a sufficient level, contacts 14 will open to deenergize the exterior lights, thereby saving energy which is no longer necessary to illuminate the area in question.

The circuit of FIG. 1 must have some means for adjusting the level at which the relay contacts 14 are operated. This adjustment commonly is made in a mechanical way as by appropriately aiming the photosensor relative to the sun or by employing a movable shutter which can be fixed in position to shade a portion of the sensor area. Secondly, means must be provided to prevent unnecessary cycling of the lights on and off due to varying natural light levels. For example, on a partly cloudy day, variations in daylight levels may occur over a range of 10:1 or greater, depending upon whether the sun is obscured or unobscured by cloud cover. In the simple arrangement of FIG. 1 this does not create a problem because the level at which the relay contacts 14 open is so low that even cloudy conditions during daylight hours will still be much brighter than the threshold value. Furthermore, the relay characteristics may be designed so that the current of coil 12 required to open the normally closed contacts 14 is far greater than the current at which they release. Therefore, once the actuation point is reached, the light level would have to decrease dramatically to cause the relay to release. Such a low light level is not typically reached until the sun sets.

The simple device of FIG. 1 cannot be easily used for control of indoor lighting. This is because the adjustment of the exterior mounted sensor or a sensor using a mechanical adjustment is difficult and time consuming and the adjustment procedure is so complex and time consuming that the likelihood increases that proper adjustment cannot be achieved. Secondly, the light levels required indoors for normally working conditions can be much greater than typical exterior conditions demand and the amount of light provided by natural illumination in the indoor region is far less than in the outdoor areas since light must generally pass through windows or skylights of limited area and transmittance. However, large variations in natural light still exist. Under these conditions, the simple circuit of FIG. 1 cannot provide proper performance for adequate energy saving operation.

The arrangement of FIG. 2 shows a prior art arrangement similar to that previously described in connection with U.S. Pat. No. 4,281,365. The device of FIG. 2 employs a conventional photosensor 20 which is connected to one input of comparator 21 which has an output pin 22 which changes state between a high and low condition when the output of photosensor 20 crosses some predetermined threshold value. A feedback circuit is connected through an adjustable hysteresis resistor 23 which makes a connection between the output pin 22 of comparator 21 and its second input as shown. This hysteresis feedback will cause the comparator output level to go from a high state to a low state at a significantly different light level than that at which the output went from a low state to a high state. By adjustment of the potentiometer 23, it is possible to adjust the difference in light levels at which switching takes places to switch on or to switch off. An adjustable reference voltage source 24 is connected through resistor 25 to one end of the hysteresis resistor 23 and to the positive input of comparator 21.

The output pin 22 of comparator 21 is then connected to an adjustable time delay circuit 26 as shown. The time delay circuit 26 provides a suitable time delay between the time the state of pin 22 changes until the time that a suitable input current is applied to the relay coil 27 of relay 28 to cause the normally open relay contacts 29 to change state.

Relay contacts 29 are connected to a suitable power line which controls the energization of the interior lighting of the area which is being controlled. The purpose of the adjustable time delay 26 is to reduce the number of on/off switching cycles of the artificial light circuit which might otherwise occur in the presence of a broken cloud cover or some other frequent cause of change in the natural light level which is applied to the photosensor 20. Thus, if the output of comparator 21 changes state for a period less than the delay time of adjustable delay 26, no change in output state will occur and a possibly unnecessary switching cycle is inhibited.

As pointed out previously, the natural light level at which the artificial lighting must be turned on is much higher in an interior lighting application than in the case of the exterior lighting system of FIG. 1. This, combined with the fact that there is much lower maximum daylight level within the region being controlled, means that the hysteresis for the indoor control must be smaller than that in an exterior control system if switching is to take place. As an example of the above, assume an exterior parking lot which must be lighted to two foot candles by the artificial lighting system of FIG. 1. The control must then be adjusted to turn the lights on when daylight level falls below the two foot candle level. If the hysteresis within the relay 13 of FIG. 1 is set for a 20:1 ratio between switch off and switch on levels, the lights will turn off at 40 foot candles and turn on at the desired two foot candles. The 20:1 ratio which is available within the relay 13 will provide an adequate guard band against typical cloud variations of 10:1. Thus, since maximum daylight levels can exceed 10,000 foot candles outdoors, an upper switch level of 40 foot candles is easily exceeded even on overcast days when the maximum may be only about 1,000 foot candles, and system operation is quite satisfactory.

Consider next the typical interior situation. The desired light level provided by artificial lights could typically be 70 foot candles. Thus, the switch-on point for the system must be set to a much higher level than in the exterior lighting system of FIG. 1. It is also known that only a small fraction of available daylight will enter a typical interior area. Typically, 2% of the exterior light can be used to illuminate the interior region of an interior volume. This would provide about 200 foot candles of light in an interior region when the exterior light is at maximum daylight levels. Broken clouds will cause this level to rapidly vary, however, from 200 foot candles down to 20 foot candles. Therefore, if the hysteresis of the circuit of FIG. 2 is maintained at 20:1 as in the case of FIG. 1, the system would not switch off until 1400 foot candles are reached. Consequently, no switching could occur since the maximum level available within the interior region is only 200 foot candles.

For the above reason, hysteresis for interior lighting circuits must be reduced or no energy can be saved. It is, however, necessary to provide some hysteresis to prevent rapid oscillation about a switching level particularly when the sensor is located in the controlled area since part of the light falling on the sensor is from the artificial lights themselves. If the hysteresis ratio is reduced to 1.5 as an example, then in the interior room, light will be switched off at 105 foot candles and will be switched back on at 70 foot candles and substantial energy can be saved. However, in the system of FIG. 2, broken clouds will cause the system to constantly switch on and off since the artificial light will reduce to 20 foot candles which is lower than the 70 foot candle minimum and will be as high as 200 foot candles which is above the 105 foot candle switch point. This frequent switching will be noticeable and disturbing to occupants within the controlled area since each switch results in a substantial change of lighting level from the 70 foot candle level.

It is greatly desirable to minimize the number of switching cycles to as large an extent as possible while still providing adequate illumination and substantial energy saving. Rapid switching is reduced to some degree by the adjustable time delay 26 of FIG. 2. Thus, by delaying the actuation or release of the power switching device 28, it is possible to reduce the number of switching cycles by ignoring light level transitions which last for a time less than the predetermined time delay of circuit 26. Typically, time delays of the order of 10 seconds to 10 minutes can be used with the delay before switching interior lights on being much shorter than the delay which occurs before the lights will be switched off (in order to prevent long periods of excessive low lighting levels). For example, if the short delay is 10 seconds and the long delay 10 minutes, any excursion of daylight below 70 foot candles for greater than 10 seconds would cause the light to switch on, and any excursion above the 105 foot candles level for greater than 10 minutes would cause the interior lights to switch off.

The system described above in connection with FIG. 2 has a number of shortcomings. First, no matter what time delay periods are chosen, the variation in natural daylight can still be sufficiently great to cause frequent cycling unless the longer time delay is increased to an unreasonable level. Thus, if natural daylight changes between 20 foot candles and 200 foot candles regularly at 11 minute intervals, the artificial lights in the controlled area would switch on for one minute and 10 seconds out of each 22 minute cycle. This would be extremely annoying to occupants of the room.

If the 10 minute time delay were increased dramatically to, for example, one hour, then any daylight pattern which dropped below the 70 foot candle limit during the one-hour delay period would cause the delay to be reset and the system might never turn off the lights. Even if the system did result in turning off the lights, a condition is possible in which daylight varies every 1.1 hours due to a small cloud passing over the sun, which would cause lights to switch on for another full hour. Thus, the lights would be on for an excessive length of time, when they were not needed, and the occupants of the controlled area would be subjected to six or seven switching cycles in a typical eight-hour work period.

Also, if daylight level were to fall only slightly below the 70 foot candle reference, the system would react in exactly the same manner as if the daylight was gone completely. For example, if the daylight level were to fall to 65 foot candles for 10 seconds, the artificial light could be turned on, although it is nearly impossible for the average person to distinguish between 70 and 65 foot candles.

In addition to the above difficulties, the circuit arrangement of FIG. 2 has four individual parameters which must be chosen for proper operation of the system. These are switch-on level, amount of hysteresis, turn-on time delay and turn-off time delay. These four parameters are generally adjusted by respective potentiometers or other control devices. However, the adjustment of this many interacting control elements becomes a difficult and tedious task, particularly since one must observe the system operation of a widely varying range of natural lighting conditions and possess a high degree of understanding of the system operation to obtain a satisfactory system adjustment. The difficulty of this task makes it unlikely that the adjustment will be properly made so that the potential advantages of the system for saving energy might be unavailable to the average user.

Moreover, many systems use sensors which do not discriminate well between natural and artificial light so that large amounts of hysteresis might be needed to prevent unacceptable system oscillation. This again reduces the potential energy savings.

The first embodiment of the present invention is shown in FIG. 3. Referring to FIG. 3, there is schematically illustrated a voltage output photosensing device 30 which may be of conventional structure and can, for example, have the construction shown in U.S. Pat. No. 4,236,101 or of any other prior art lighting control photosensor arrangement. Photosensor 30 is connected to the negative input pin of comparator 31 through a novel filter circuit 32 which serves the function of injecting automatically adjusted time delays into the circuit, as will be later described. The output of the comparator 31 is connected back to the positive input terminal of the comparator through a fixed hysteresis resistor 33. A fixed reference voltage source 34 and resistor 35 are also provided and connected to the positive input pin of comparator 31. The output of the comparator 31 is then connected directly to the relay coil 36 of relay 37 which has normally open power contacts 38 which are connected to the power circuit for controlling the indoor lights.

The novel circuit of FIG. 3 avoids the problems previously described in connection with the prior art circuits of FIGS. 1 and 2. This improvement is obtained by connecting the output of light sensor 30 through the filter network 32 before it is applied to the input of comparator 31. Filter 32 produces time delays in applying the output signal of the photosensor to the comparator. Unlike the prior art, these time delays are variable and depend on the characteristics of the natural light being sensed by the sensor 31 at any instant. Filter 32 serves to essentially cause the system to adapt its operating parameters to the instantaneous lighting conditions. Due to this adaptive control capacity, it becomes possible to fix many of the system parameters to known values and to provide only a single adjustment for the user to make after the system is installed. Furthermore, it becomes possible to provide an indicator, as will be later described in connection with FIG. 4, to alert the user as to when the proper state of adjustment is reached. The on/off switching cycles will be minimized by the novel invention particularly because of the adaptive and automatic adjustment of the time delays and substantial energy will be saved while minimizing disturbance to the users in the controlled area.

As previously stated, the photosensor 30 is preferably mounted in an optimally chosen spatial region so that the sensor response to natural light is maximized and its response to artificial light is minimized, despite the fact that the sensor is mounted in the controlled area. The mounting of the photosensor within the controlled area is desirable because the natural light level sensed will then be subject to the same window modification effects, for example, due to glass area, transmittance and glare control devices, as the actual controlled area and more accurate control is possible. This will allow maximum energy savings while still maintaining adequate illumination.

The operation of the circuit of FIG. 3 is as follows: The photosensor 30 produces an output voltage which is generally linearly proportional to the illumination level falling upon the photosensor. Optimally, this level is entirely due to the natural light entering the controlled area. The filter 32 can take many forms but, for the purpose of the present explanation, the filter will be assumed to have an exponential time response such that when the voltage at the input of the filter 32 is changed in a stepwise fashion from a voltage $V_1$ to a voltage $V_2$, the output voltage, as a function of time, is described by the expression $V(t)=V_2+(V_1-V_2)e^{-t/T}$. In the above expression, T is the characteristic time constant of the filter.

Comparator circuit 31 is a conventional comparator circuit and includes hysteresis as described previously, so that the output of the comparator will change state when its input rises above a relatively high voltage level (hereinafter termed $V_{off}$) or drops below a relatively low level (hereinafter termed $V_{on}$). This characteristic, along with that of the filter 32, provides the necessary time delay function in the following manner:

Assume the output of sensor 30 is at some contant level $V_1$ which is below $V_{on}$ and has been at this level for a long period relative to the time constant T. The filter output will also be essentially equal to $V_1$ and the artificial lights will be in their energized state. If now the sensor output suddenly rises to a value $V_2$ which is above $V_{off}$, nothing can happen until the comparator input rises above $V_{off}$. If the above equation describing the filter response of filter 32 is solved for the value of t such that $V(t)=V_{off}$, the delay time ($t_D$) between the change in said sensor output and the change of comparator output will be $t_D=T \ln[(V_1-V_2)/(V_{off}-V_2)]$.

A similar calculation can be made for any step change in input level corresponding to a rapid change in natural daylight. It should be noted that the time delay $t_D$ is not a fixed time delay as in prior art arrangements, but the delay $t_D$ varies with the initial and final values of illumination level, as well as with the instantaneous comparator voltage and filter time constant. Thus, if the initial voltage is close to $V_{off}$, then the time delay will be relatively short. This corresponds to a situation wherein the initial light level is almost high enough to allow turning off the artificial lighting so that a relatively short delay, once the level rises, is justified and maximizes energy savings. Moreover, a high value of $V_2$ has a similar effect. Both these conditions, an initial value close to $V_{off}$ but below it, and a final value far above $V_{off}$ tend to indicate a high level of natural light availability, so that a relatively short delay before turning off artificial illumination is a reasonable procedure to follow since the high level of natural light means that the artificial lights can be off most of the time, while there is still sufficient light in the controlled area.

Conversely, if the initial value is far below $V_{off}$ and/or the final value is only slightly above $V_{off}$, the time delay will be very long. This is now proper since the general level of available daylight now seems to be barely adequate, so even if it momentarily rises above $V_{off}$, if one were to deenergize the artificial lighting, it is likely that the natural light would fall to a very low level and the lights would have to be immediately turned back on. This is the annoying rapid cycling phenomenon which could be experienced by the prior art arrangements. To avoid this in prior art arrangements employing fixed time delays, a compromise must be made between the long time delay which minimizes cycling but sacrifices energy savings and the short time delay which would produce the best energy savings at the price of rapid cycling. With the present invention, there is automatic adjustment of the time delays to minimize cycling by adopting long delays during periods of barely adequate natural light levels but changing the shorter delays for optimum energy savings when natural light rises to substantial levels. A similar action occurs when natural light levels are decreasing. If the level drops barely below the $V_{on}$ trip point, it must remain there for quite a long time before the lights will actually come back on. This is no hardship to users of the area so they will only be marginally short of light and may not notice the small light reduction and unnecessary cycling is prevented. On the other hand, a drop in natural light to a level substantially below $V_{on}$ will result in a short time delay so that area users are subjected to an extended period with greatly insufficient illumination levels.

In actual practice, as will be later described, the time constant for decreasing light levels may be made significantly shorter than that for increasing levels to minimize the time spent in low light level conditions. This is accomplished by varying the filter constant T depending on whether the natural light level is rising or falling.

The adaptive nature of the novel time delay circuit which employs the filter 32 of FIG. 3 leads to an additional advantage. Thus, in the prior art, the need to compromise the fixed value of delay time resulted in a need to adjust delay time for each individual installation since various desired lighting levels and availability of daylight require different delay times to achieve a satisfactory compromise setting. This meant that at least two adjustments were needed, one for light level and one for time delay. In actual practice, however, devices with as many as three or four adjustments have been employed as described, for example, in U.S. Pat. No. 4,281,365. This required an adjustment procedure which was complex and needed to be repeated several times in order to arrive at the suitable compromise.

By using the adaptive characteristics of the present invention, time delay adjustments are unnecessary for proper operation. Also, the amount of hysteresis may be fixed. When the invention is used with a suitable photosensor which is maximally responsive to natural light and minimally responsive to artificial light, as described in U.S. Pat. No. 4,236,101, the system response to artificial light is essentially zero. No adjustment of hysteresis is then necessary and the value can be factory set to achieve optimum energy savings. Thus, use of the present invention allows the configuration of a system which contains only a single adjustment which can be made by the user for adjustment of the switching level and the proper adjustment and operation of the system is thereby greatly facilitated.

FIG. 4 shows a second embodiment of the invention and components identical to those of FIG. 3 have been given identical identifying numerals. FIG. 4 also shows an adjustable potentiometer 40 between the photosensor 30 and filter 32 and further shows a circuit network for providing an indicator to give the user a positive and instantaneous indication of proper system adjustment. Without such an indicator, the user must make an adjustment in FIG. 3, for example, of a resistor such as potentiometer 40 in FIG. 4 and wait until the time delay built into filter 32 expires before the effect of the adjustment becomes apparent. Thus, the user has only his own intuition and understanding of system operation to guide him in making corrections to his adjustments. With multiple adjustments, as in the prior art, it is impossible to provide an indication of proper adjustment since a single indicating device cannot know the parameters of the controlled area in order to deduce correct settings.

With only a single adjustment, however, an indicator may be provided which indicates, for instance, that the input voltage to the filter 32 is now equal to the level at which the comparator would cause the lights to turn on again. This level is known by the indicator because it is fixed by the designer and is not subject to change by the user. Note that by driving the indicator circuit from the voltage in front of the filter 32 and before it is acted on by the filter 32, the indicator response to the adjustment can be essentially instantaneous. Thus, the user making the adjustment no longer has to wait for the expiration of the time delay to see the effect of his adjustment and the adjustment is quick and simple to accomplish.

In FIG. 4 the indicator circuit consists of a second comparator circuit 50 connected in front of filter 32. Comparator circuit 50 is provided with a fixed reference voltage 51 to its second input pin and the output of comparator 50 operates a suitable indicating device 52 which can, for example, be a light-emitting diode or meter, or the like. The indicator reference voltage 51 is typically made equal to the reference voltage at which the control comparator 50 will cause artificial lights to turn on.

In order now to adjust the overall system, the user simply waits until incoming daylight reaches a level at which the user wants the exterior lights to turn on. The adjustment means 40 is then set until the comparator 50 changes state and the indicating device 52 turns on or reaches some predetermined level which has been set at the factory. This will then indicate an output voltage of the sensor which, after a time delay imposed on it by the filter 32, would have caused the relay 37 to operate in order to bring on the lights. This setting and adjustment is made practically instantaneously and can be made by untrained personnel.

FIG. 5 is a detailed circuit diagram of a circuit which carries out the functions described in connection with FIGS. 3 and 4. The circuit of FIG. 5 is provided with terminals 60 to 66. Terminals 60 and 61 are a-c power terminals for supplying power to the control circuit. Terminals 60 and 61 may, for example, be connected to a 12.6 volt secondary winding and are connected to a single phase full wave bridge connected rectifier 70. The output of rectifier 70 is then connected to the resistive divider consisting of resistors 71 and 72. A diode 73 and capacitor 74 are connected as shown. Note that capacitor 74 is connected to the node between resistors 75 and 76 and then to pin 5 of comparator 77 which corresponds to the second comparator 50 of FIG. 4. Diode 73 acts as a decoupling diode, as will be later seen, and prevents the filter capacitor 80 from discharging into the relay coil to be described. Comparator 77 may be a type LM3424.

It should also be noted that the signal applied to pin 5 of comparator 77 will have a ripple corresponding to the output ripple of rectifier bridge 70 since the output to pin 5 is unfiltered. The output of rectifier 70 is also applied to a filter circuit consisting of capacitor 80 and resistor 81. The output of this filter is applied to a 12 volt Zener diode 82.

The regulated output voltage is then applied across the resistive divider consisting of resistors 75 and 76 and is applied to the power amplifier circuit consisting of transistors 85 and 86, the output of which is connected to the indicating device which includes light emitting diodes 87 and 88 and a parallel resistor 89. LED 87 has a green output light and LED 88 has a red output light. The LEDs are arranged such that LED 88 is on when the output of amplifier transistors 85 and 86 and thus of the photosensor to be described is low, while the green output LED 87 will be on when the output of the photosensor is high. The parallel connected LEDs 87 and 88 are then connected to the node between resistors 90 and 91 which are also connected across the regulated output voltage of the Zener diode 82.

In the circuit described to this point, it was noted that the voltage at the node between resistors 75 and 76 is applied to pin 5 of comparator 77 where this voltage will have a ripple voltage superimposed around a reference value. The voltage applied to pin 6 of comparator 77, as will be later described, is the processed output voltage of the photosensor. The output voltage at pin 6 will then in effect oscillate above and below the voltage on pin 5 so that the green LED 87 and red LED 88 will turn on and off each half cycle to produce the effect of a combined orange light when the system is in proper adjustment. Thus, the user of the system making an adjustment for the light level at which the device should become operative will know immediately that the system is in proper adjustment. If, however, the adjustment of the system is such that the output voltage at pin 6 is too high, the output of comparator 77 will turn on only the green LED 87 and alternatively, if the adjusted output voltage is too low, the output of comparator 77 will be low so that only the red LED 88 is turned on. When, however, the adjustment is correct, the output voltage at pin 6 will be within the ripple value applied to pin 5 so that both LEDs 87 and 88 will sequentially turn on and off to produce an orange appearance, indicating a correct adjustment setting.

The input terminal 62 shown to the left in FIG. 5 is the photo-head supply voltage terminal and is connected to the photo-head which is remotely positioned relative to the circuit of FIG. 5. The photohead is also connected to terminals 63 and 64 which are the photo-head output signal terminal and photo-head common reference point, respectively. The 12 volt potential immediately atop Zener diode 82 is connected to the resistor 95 as shown and is also connected to pin 4 of operational amplifier 96 and to pin 7 of operational amplifier 97. Amplifier 96 as will be later described is a non-inverting amplifier having a gain of approximately 6 and acts to provide an amplified photo-head output signal from pin 1 to pin 6 of comparator 77. Operational amplifier 97, as will be later described, is contained in the filter network and has the effect of making the filter capacitor appear to have a greater value and enables a reduction in the filter capacitor size. Operational amplifier 96 may be a type LM324 and operational amplifier 97 may be a type CA3140.

The photo-head output voltage between terminals 63 and 64 is applied to an adjustment circuit corresponding to adjustment means 40 in FIG. 4 and consisting in FIG. 5 of adjustable resistor 100 and fixed resistors 101 and 102. The output of resistor 100 is connected to the positive input terminal of amplifier 96 at pin 3 while the input terminal at pin 2 is connected to the common reference voltage through resistor 105. A conventional feedback resistor 106 is also provided.

The output of amplifier 96 is then applied to a filter circuit having the function of filter 32 of FIG. 4. The filter in FIG. 5 includes filter resistor components including resistor 110, resistor 111 and diode 112 and a capacitive component which includes capacitor 113, the operational amplifier 97 and its associated resistors 114 and 115. Note that during the discharge interval of the filter capacitor, the capacitor discharges through resistors 110 and 111 in parallel since the diode 112 is forward biased. When charging the filter capacitor, however, the charging current flows through only resistor 110 since the diode 112 is reverse biased. Therefore, the filter has different time constants during filter charging or filter discharging which correspond to filter induced time delays of different values when light levels are to be increased or decreased.

By placing the operation amplifier 97 in circuit relationship with the filter capacitor 113, the apparent size of the capacitor is increased where, for example, the capacitor component of the filter has an effective capacitance of 1,500 microfarads when, in fact, capacitor 113 is only a 2.2 microfarad device. The filter described will have a time constant, for example, of 600 seconds during filter discharging.

FIG. 5 next shows the main comparator circuit 120 which coresonds to comparator 31 in FIG. 4. The input to pin 13 of comparator 120 comes from the output of the filter circuit which output is taken from the node between resistors 110 and 111 of the filter. A noise suppression capacitor 121 is connected across pins 12 and 13 of capacitor 120. Comparator 120 can be a type LM324 integrated circuit.

The network consisting of resistors 122, 123 and 124 define the hysteresis resistor 33 in FIG. 4. The regulated 12 volt output of Zener diode 82 is applied to the resistor 122 as is shown, and corresponds to the fixed reference voltage 34 in FIG. 4.

A circuit consisting of resistor 130 and capacitor 131 is then connected to the output pin of comparator 120 as shown and serves as a further noise suppressor. The output terminal of comparator 120 is also connected to an amplifier circuit which consists of resistor 135, resistor 136 and transistor 137. The output of the transistor amplifier is connected to the relay circuit which corresponds to relay 37 of FIG. 4.

The relay of FIG. 5 consists of a pilot relay having a coil 140, a normally open contact 141 and a protective diode 142. This relay can be a commercially available reed type of relay. The contacts 141 can be used at terminals 65 and 66 to control a high power relay which controls the application of power to the internal lighting.

The operation of the circuit of FIG. 5 will directly follow that described in connection with FIG. 4. Additional features in FIG. 5 include the novel combined operation of LEDs 87 and 88 and the use of the operational amplifier 97 for increasing the apparent value of filter capacitor 113.

In implementing the circuit of FIG. 5, the resistor values and capacitor values which appear in the following table have been used. In addition to these components, the transistors 86 and 137 were type 2N4125 while transistor 85 was a type 2N4123.

| RESISTORS | (Ohms) |
| --- | --- |
| 71 | 10K |
| 72 | 100K |
| 75 | 10K |
| 76 | 33K |
| 81 | 220 |
| 89 | 1K |
| 90 | 680 |
| 91 | 680 |
| 95 | 470 |
| 100 | 220K |
| 101 | 27K |
| 102 | 1K |
| 105 | 100K |
| 106 | 510K |
| 110 | 390K |
| 111 | 47K |
| 114 | 680K |
| 115 | 115K |
| 122 | 100K |
| 123 | 220K |
| 124 | 150K |
| 130 | 10K |
| 135 | 120K |
| 136 | 68K |
| CAPACITORS | (Microfarads) |
| 74 | 0.01 |
| 84 | 100 |
| 113 | 2.2 |
| 121 | 0.01 |
| 131 | 0.01 |

It should be noted that in the implementation of FIG. 5, the output of the photo-head is derived from daylight only and not artificial light which comes from the controlled luminaires. Thus, the control system is an open loop control system such as that described in U.S. Pat. No. 4,236,101. It will also be noted that in the circuit of FIG. 5, there is only a single user accessible adjustment consisting of the trim potentiometer 100.

In order to calibrate the system, the calibration is performed under a given desired daylight level condition and the calibration potentiometer 100 is adjusted until the LED indicators show orange. In the adjustment, the circuit will be set so that when there is too little light, pin 14 of comparator 120 is high. This places resistor 123 in approximately parallel circuit relationship with resistor 122. This then sets a relatively high reference voltage at pin 12 of comparator 120. When the light level rises after the delay imposed by the filter circuit so that the voltage at pin 13 exceeds the voltage at pin 12, pin 14 of comparator 20 switches low. This places resistor 123 effectively in parallel with resistor 124 and lowers the reference voltage at pin 12. Now the light level must go lower than the level which caused the operational amplifier 96 to switch states before the new reference voltage will be reached at pin 13 of operational amplifier 120 and before the amplifier can return to its original state.

Although the present invention has been described in connection with preferred embodiments thereof, many variations and modifications will become apparent to those skilled in the art. It is preferred, therefore, that the present invention be limited not by the specific disclosure herein, but only by the appended claims.

What is claimed is:

1. An excess light turn-off circuit for interior spaces which are provided with both natural and artificial lighting; said excess light turn-off circuit including: a light level sensor which produces an output signal related to the light level which impinges thereon; an adaptive electrical filter circuit connected to the output of said light level sensor, said filter producing an output which changes in a predetermined manner to a new level when the output of said light level sensor changes; a comparator circuit having a first input connected to the output of said filter circuit and having a second input; a fixed reference voltage circuit connected to said second input of said comparator circuit; said comparator circuit having an output which switches from a first level to a second level when the voltage at its said first input reaches a first given value relative to said fixed reference voltage circuit at its said second input; the ratio of said first given value and said fixed reference voltage circuit having a value which changes with the initial steady state input to said filter circuit; and relay switching means connected to control said artificial lighting in accordance with available natural light in order to conserve energy; said comparator circuit output connected to said relay switching means and operating said relay switching means to turn said artificial lighting on and off when said comparator circuit output switches between its said first and second levels.

2. The circuit of claim 1 which includes hysteresis circuit means connected to said comparator circuit and to said reference voltage circuit for changing said fixed reference voltage circuit between first and second values, depending on whether said comparator circuit output is at its first or second level, respectively.

3. The circuit of claim 1, wherein said adaptive filter is an R-C circuit.

4. The circuit of claim 2, wherein said filter circuit is an R-C circuit.

5. The circuit of claim 1 which includes a single user adjustment means for adjusting the level at which said relay switching means is operated; said single adjustment means coupled between said light level sensor and said filter circuit.

6. The circuit of claim 2 which includes a single user adjustment means for adjusting the level at which said relay switching means is operated; said single adjustment means coupled between said light level sensor and said filter circuit.

7. The circuit of claim 5 which further includes a second comparator circuit having first and second inputs and an output which is dependent upon the relationship of its said first and second inputs; a second fixed reference voltage circuit and an adjustment indicator; said single adjustment means and said second fixed reference voltage circuit connected to said first and second inputs respectively of said second comparator circuit; said output of said second comparator circuit connected to said adjustment indicator whereby said adjustment indicator indicates the output level of said light level sensor relative to said second reference voltage independently of delays due to said adaptive filter.

8. The circuit of claim 7 which includes hysteresis circuit means connected to said comparator circuit and to said reference voltage circuit for changing said fixed reference voltage circuit between first and second values, depending on whether said comparator circuit output is at its first or second level, respectively.

9. The circuit of claim 7, wherein said adaptive filter circuit is an R-C circuit.

10. The circuit of claim 9, wherein said R-C circuit has a first time constant when the input voltage thereto is increased and has a different time constant from said first time constant when the input voltage thereto is decreased.

11. An excess light turn-off circuit for spaces which are provided with both natural and artificial lighting; said excess light turn-off circuit including: a light lever sensor which produces an output signal related to the light level which impinges thereon; an adaptive electrical filter circuit connected to the output of said light level sensor and producing an output which changes exponentially to a new level when the output of said light level sensor changes; a comparator circuit having a first input connected to the output of said filter circuit and having a second input; a fixed reference voltage circuit connected to said second input of said comparator circuit; said comparator circuit having an output which switches from a first level to a second level when the voltage at its said first input reaches a first given value relative to said fixed reference voltage circuit at its said second input; the ratio of said first given value and said fixed reference voltage circuit having a value which changes with the initial steady state input to said filter circuit; and relay switching means connected to control said artificial lighting in accordance with available natural light in order to conserve energy; said comparator circuit output connected to said relay switching means and operating said relay switching means to turn said artificial lighting on and off when said comparator circuit output switches between its said first and second values; and an adjustment means for adjusting the level of the output of said light sensor at which said relay switching means is operated to a different condition; said adjustment means being connected between said light level sensor and said filter circuit.

12. The circuit of claim 11 which further includes a second comparator circuit having first and second inputs and an output which is dependent upon the relationship of its said first and second inputs; a second fixed reference voltage circuit and an adjustment indicator; said adjustment means and said second fixed reference voltage circuit connected to said first and second inputs of said second comparator circuit; said output of said second comparator connected to said adjustment indicator whereby said adjustment indicator indicates the instantaneous output of said light level sensor relative to said second reference voltage independently of delays due to said filter circuit.

13. The circuit of claim 1 or 11, wherein said light sensor is exposed only to natural light which reaches said interior spaces.

14. The method of controlling interior lighting within a controlled area in accordance with the availability of natural light; said method comprising the steps of monitoring at least a component of the light within said area and producing a first electrical output signal which is proportional to the instantaneous light level; applying said first output signal to a filter circuit which has an output which changes exponentially from a prior fixed level to a new level within a time to which is dependent on the initial output of said first electrical output signal and wherein:

$$t_D = T \ln \frac{(V_1 - V_2)}{V_{off} - V_2}$$

wherein T is the time constant of said delay circuit, $V_2$ is the output voltage of said filter circuit after the time T, $V_1$ is the output voltage of said filter circuit before the time T and before the input to said filter is changed and $V_{off}$ is the value of the output voltage at which said interior lighting should be turned off; comparing the output voltage of said filter to a reference voltage, and turning said interior lighting on or off in accordance with the value of said output voltage relative to said reference voltage.

15. The method of claim 14 which comprises the further step of adjusting a single adjustment device connected at the input of said filter to set the switching level of said interior lighting.

16. The method of claim 15, wherein the adjustment of said single adjustment device varies said first output signal to produce a change in said output voltage $V_2$, and thereafter comparing said changed output voltage $V_2$, unmodified by said filter circuit, to a second fixed reference voltage, and producing an output signal to indicate that said changed output voltage $V_2$ is set at a given value relative to said second fixed reference voltage.

* * * * *